US011204722B1

(12) United States Patent
Agarwal et al.

(10) Patent No.: US 11,204,722 B1
(45) Date of Patent: Dec. 21, 2021

(54) CONTENT-AWARE STORAGE SYSTEM AND METHOD FOR USE THEREWITH

(71) Applicant: Western Digital Technologies, Inc., San Jose, CA (US)

(72) Inventors: Dinesh Kumar Agarwal, Karnataka (IN); Amit Sharma, Karnataka (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/892,966

(22) Filed: Jun. 4, 2020

(51) Int. Cl.
*G06F 3/06* (2006.01)
*G06T 3/40* (2006.01)

(52) U.S. Cl.
CPC .......... *G06F 3/0659* (2013.01); *G06F 3/0608* (2013.01); *G06F 3/0653* (2013.01); *G06F 3/0673* (2013.01); *G06T 3/40* (2013.01)

(58) Field of Classification Search
CPC .... G06F 3/0608; G06F 3/0653; G06F 3/0659; G06F 3/0673; G06T 3/40
See application file for complete search history.

(56) References Cited

U.S. PATENT DOCUMENTS

| 5,493,677 | A | * | 2/1996 | Balogh | G06Q 30/04 |
| | | | | | 382/305 |
| 5,696,888 | A | | 12/1997 | Ikeda | |
| 6,885,395 | B1 | * | 4/2005 | Rabbani | H04N 1/2112 |
| | | | | | 348/231.1 |
| 8,400,528 | B2 | | 3/2013 | Ochi et al. | |
| 8,970,761 | B2 | | 3/2015 | Anderson | |
| 2001/0013896 | A1 | * | 8/2001 | Anderson | H04N 5/772 |
| | | | | | 348/239 |
| 2005/0044112 | A1 | * | 2/2005 | Yamamoto | G06F 16/48 |
| 2005/0052469 | A1 | | 3/2005 | Crosby et al. | |
| 2005/0135790 | A1 | | 6/2005 | Hutten | |
| 2006/0268125 | A1 | | 11/2006 | Teicher et al. | |
| 2007/0279703 | A1 | * | 12/2007 | Fukuda | H04N 19/60 |
| | | | | | 358/448 |
| 2008/0098192 | A1 | * | 4/2008 | Im | G06F 12/0246 |
| | | | | | 711/170 |
| 2008/0115225 | A1 | | 5/2008 | Jogand-Coulomb et al. | |
| 2013/0222641 | A1 | | 8/2013 | Honda | |

(Continued)

OTHER PUBLICATIONS

Snavely, Noah,. Lecture 3: Image Resampling. CS4670: Computer Vision [online], [retrieved on Jul. 1, 2021], Retrieved from the Internet <URL: https://web.archive.org/web/20120711064824/http://www.cs.cornell.edu/courses/cs6670/2011sp/lectures/lec03_resample.pdf> (Year: 2012).*

(Continued)

*Primary Examiner* — Larry T Mackall
(74) *Attorney, Agent, or Firm* — Crowell & Moring LLP

(57) ABSTRACT

A content-aware storage system and method for use therewith are presented. In one embodiment, a storage system is provided comprising a memory and a controller. The controller is configured to receive an image; determine an amount of spare memory space; generate a lower-resolution version of the image, wherein a resolution level of the lower-resolution version of the image is based on the determined amount of spare memory space; and store the image and the lower-resolution version of the image in the memory. Other embodiments are provided.

16 Claims, 11 Drawing Sheets

(56) References Cited

U.S. PATENT DOCUMENTS

2014/0098606 A1* 4/2014 Yip .................. G11C 16/3427
365/185.02
2020/0081637 A1 3/2020 Hu

OTHER PUBLICATIONS

International Search Report completed Apr. 26, 2021 for International Application No. PCT/US2021/016316.
Written Opinion completed Apr. 26, 2021 for International Application No. PCT/US2021/016316.
Israel Patent Office Search Strategy completed Apr. 26, 2021 for International Application No. PCT/US2021/016316.
"Pyramid (image processing)"; Wikipedia entry; downloaded from the Internet at https://en.wikipedia.org/w/index.php?title=Pyramid_(image_processing)&oldid=928663227 on Mar. 1, 2020; 5 pages.

* cited by examiner

CONTENT-AWARE STORAGE SYSTEM AND METHOD FOR USE THEREWITH

BACKGROUND

A host with an image capture device (e.g., a mobile phone with a digital camera or a dedicated digital camera) can capture and send images to a storage system for storage. Images are typically stored in the memory of the storage system in the order in which they are received from the host. The host can later retrieve the images from the memory of the storage system for review.

DETAILED DESCRIPTION

Overview

Figure 1A:
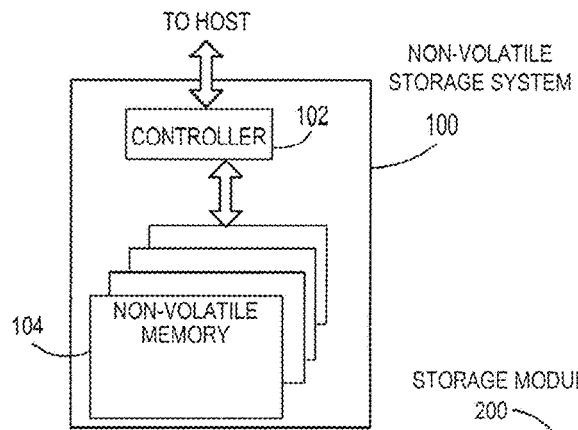
FIG. 1A is a block diagram of a non-volatile storage system of an embodiment.

By way of introduction, the below embodiments relate to a content-aware storage system and method for use therewith. In one embodiment, a storage system is provided comprising a memory and a controller. The controller is configured to receive an image; determine an amount of spare space available in the memory; generate a lower-resolution version of the image, wherein a resolution level of the lower-resolution version of the image is based on the determined amount of spare memory space; and store the image and the lower-resolution version of the image in the memory.

In some embodiments, the resolution level of the lower-resolution version of the image is also based on a size of the image.

In some embodiments, the controller is further configured to create the lower-resolution version of the image as a background operation.

In some embodiments, the controller is further configured to: receive a request from a host for the image; and decide whether to send the image or the lower-resolution version of the image in response to the request.

In some embodiments, the controller is further configured to decide whether to send the image or the lower-resolution version of the image based on application usage.

In some embodiments, the application usage comprises one or more of the following: an image search, a preview command, a compute command, an image analysis application, and a compression application.

In some embodiments, the controller is further configured to generate the lower-resolution version of the image by sub-sampling with Gaussian pre-filtering.

In some embodiments, the controller is further configured to: track changes in the amount of spare memory space; and dynamically change the resolution level of the lower-resolution version of the image based on tracked changes.

In some embodiments, the image is stored in multi-level memory cells in the memory, and wherein the lower-resolution version of the image is stored in single-level memory cells in the memory.

In some embodiments, the controller is further configured to maintain a map of memory locations of the image and the lower-resolution version of the image.

In some embodiments, the controller is further configured to associate at least some metadata of the image with the lower-resolution version of the image.

In some embodiments, the controller is further configured to delete the lower-resolution version of the image in response to a need for additional space in the memory.

In some embodiments, the memory comprises a three-dimensional memory.

In another embodiment, a method is presented that is performed in a storage system comprising a memory. The method comprises receiving an image; and storing the image and a lower-resolution copy of the image in the memory, wherein a difference in resolution levels between the image and the lower-resolution copy of the image is based on an amount of available space in the memory.

In some embodiments, the method further comprises, in response to receiving a request for the image, deciding whether to send the image or the lower-resolution copy of the image.

In some embodiments, the method further comprises dynamically changing the resolution level of the lower-resolution copy of the image based on changes to the amount of available space in the memory.

In another embodiment, a storage system is presented comprising a memory; and means for storing an image and a lower-resolution version of the image in the memory, wherein a difference between a resolution level of the image and a resolution level of the lower-resolution version of the image depends on an amount of spare memory.

In some embodiments, the image is stored in multi-level memory cells in the memory, and wherein the lower-resolution version of the image is stored in single-level memory cells in the memory.

In some embodiments, the storage system further comprises means for deciding whether to send the image or the lower-resolution copy of the image in response to a request for the image.

In some embodiments, the storage system further comprises means for dynamically changing the resolution level of the lower-resolution version of the image based an amount of the spare memory.

Other embodiments are possible, and each of the embodiments can be used alone or together in combination. Accordingly, various embodiments will now be described with reference to the attached drawings.

EMBODIMENTS

Figure 1B:
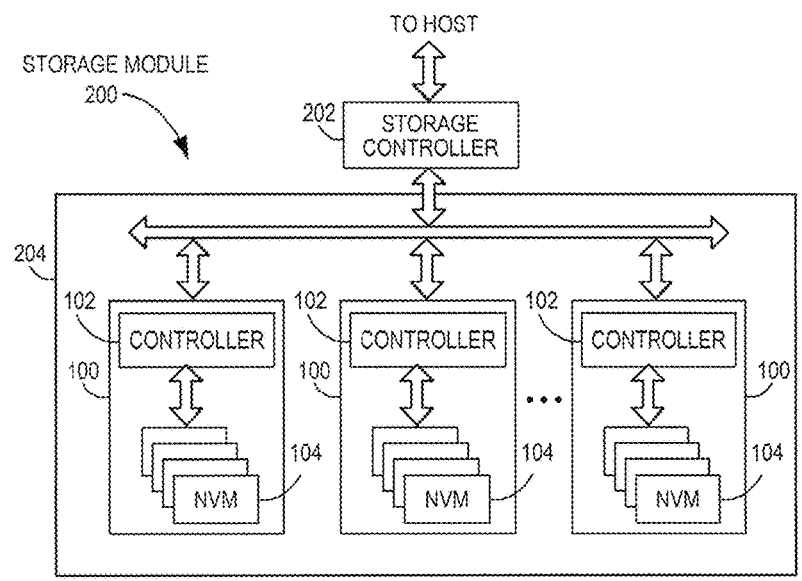
FIG. 1B is a block diagram illustrating a storage module of an embodiment.
Figure 1C:
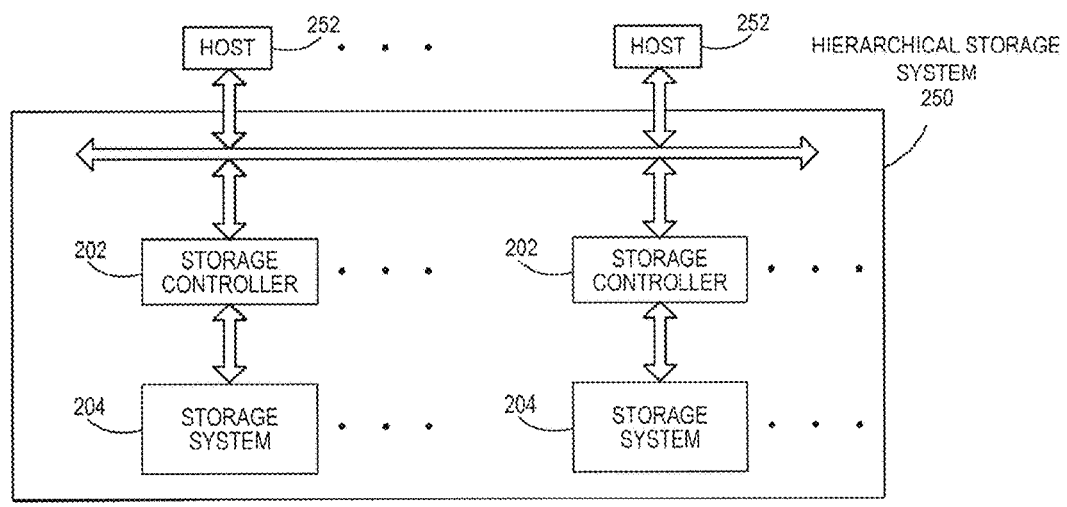
FIG. 1C is a block diagram illustrating a hierarchical storage system of an embodiment.

Storage systems suitable for use in implementing aspects of these embodiments are shown in FIGS. 1A-1C. FIG. 1A is a block diagram illustrating a non-volatile storage system 100 according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card based system, such as a secure digital (SD) or a micro secure digital (micro-SD) card. In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), 2, 4, 8 or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
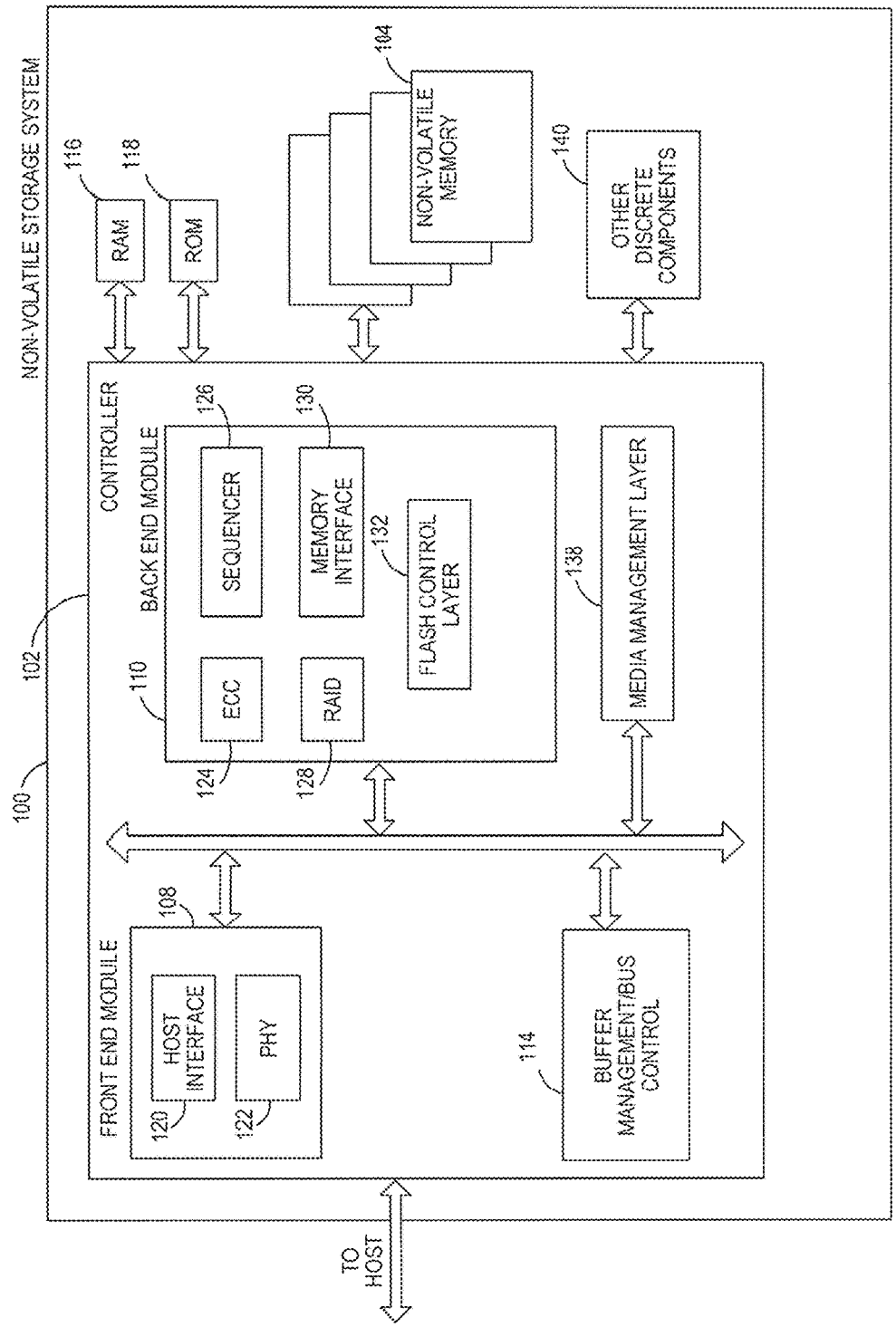
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Modules of the controller 102 can be implemented in hardware and/or software (e.g., in a processor executing computer-readable program code) to implement the methods and algorithms described below.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
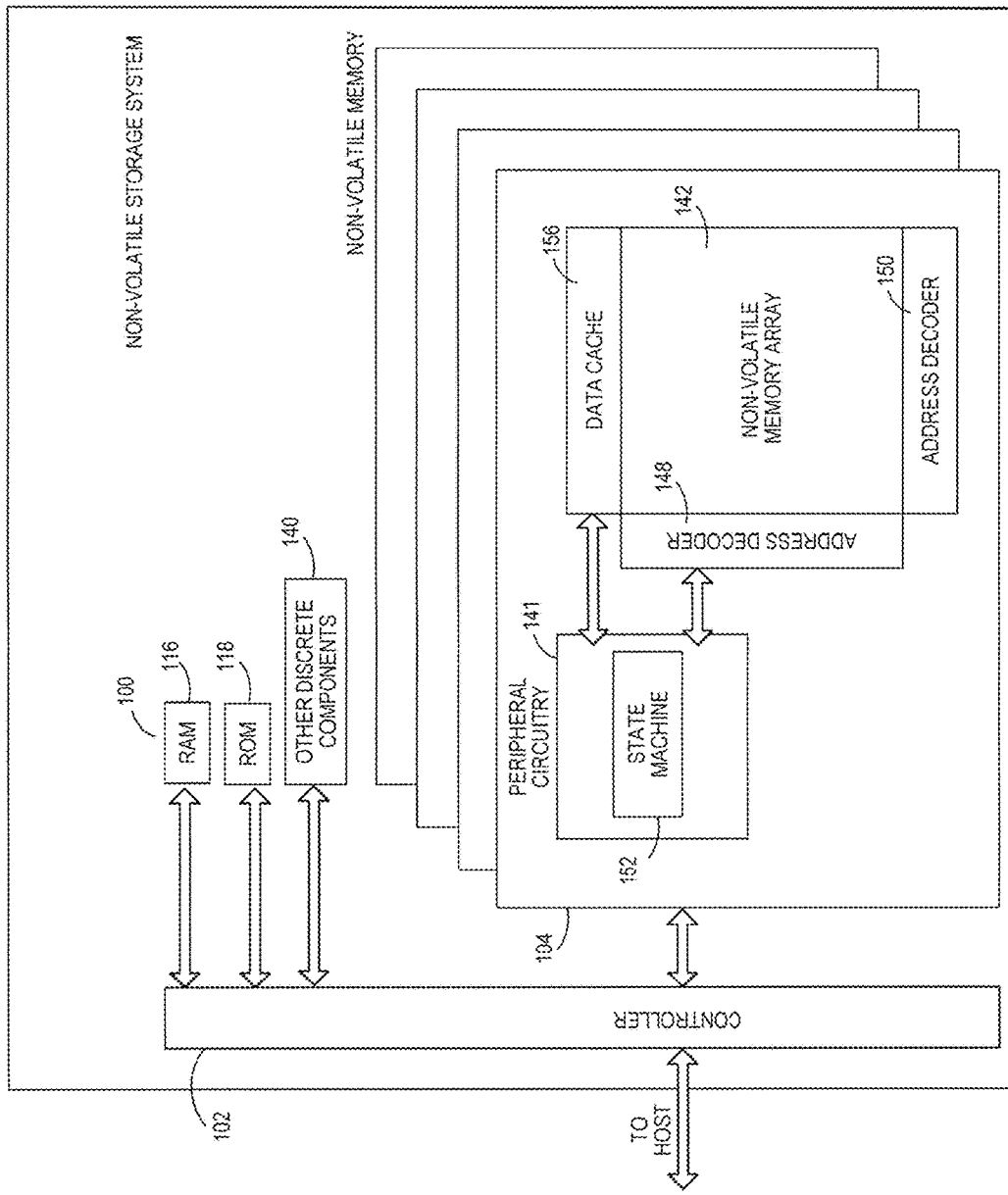
FIG. 2B is a block diagram illustrating components of the non-volatile memory storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two dimensional and/or three dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may only be written in multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
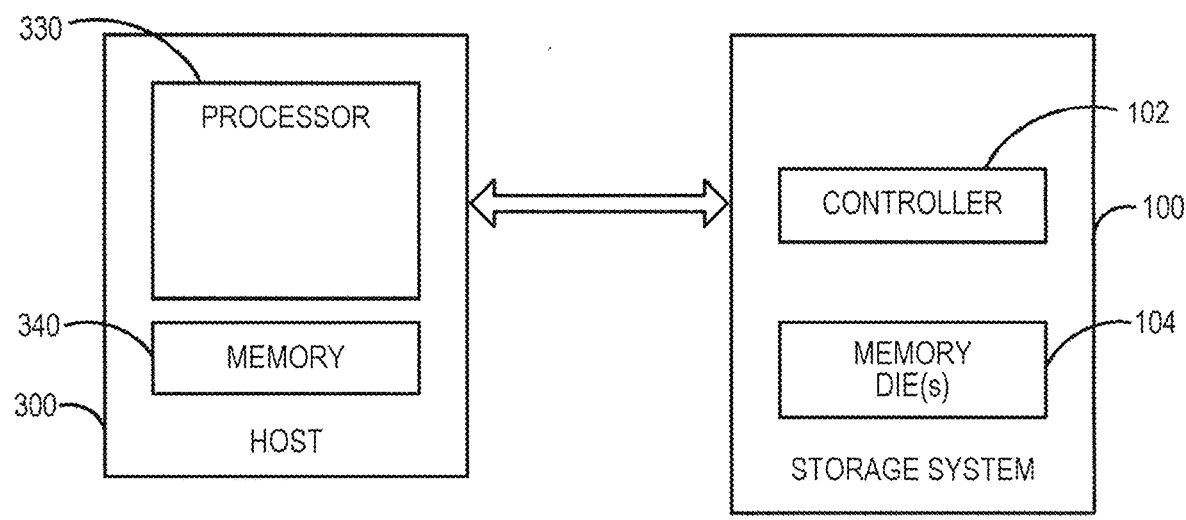
FIG. 3 is a block diagram of a host and storage system of an embodiment.

Turning again to the drawings, FIG. 3 is a block diagram of a host 300 and storage system (sometimes referred to herein as a device) 100 of an embodiment. The host 300 can take any suitable form, including, but not limited to, a computer, a mobile phone, a digital camera, a tablet, a wearable device, a digital video recorder, a surveillance system, etc. In one embodiment, the host 300 comprises an image capture device 390 (e.g., a camera) to take a picture, and the processor 330 generates a digital image representing that picture. The image can be stored in the memory 340 prior to sending the image to the storage system 100 (e.g., a memory card or an embedding storage device) for storage.

As mentioned above, a host with an image capture device (e.g., a mobile phone with a digital camera or a dedicated digital camera) can capture and send images to a storage system for storage. Images are typically stored in the memory of the storage system in the order in which they are received from the host. The host can later retrieve the images from the memory of the storage system for review.

With increasing memory card/drive/solid-state drive (SSD) capacity, the time to access memory (sometimes referred to herein as media) becomes increasingly important for various applications. Currently, images are stored in serial order in the memory (i.e., they are written in the order in which they are received from the host), and the host can read any set of images in any order. If many image requests are issued by the host (e.g., from a user using a photo application on the host), memory performance/processing of the images can become a bottleneck. The following are examples of applications and usage modes where many image requests are sent simultaneously, and the storage system's performance is important: (1) Image preview of images in the storage system, where one page can display hundreds of images. This is generally a very slow process; (2) Search for correspondence. When similar images are searched, it can be a very slow process; (3) Any kind of image compute, such as edge tracking, texture representation, and image blending. In these operations, all of the images in a set are transferred from the storage system for the operations to be performed on the host; and (4) Data compression (the storage system can intelligently manage it for images).

Figure 4:
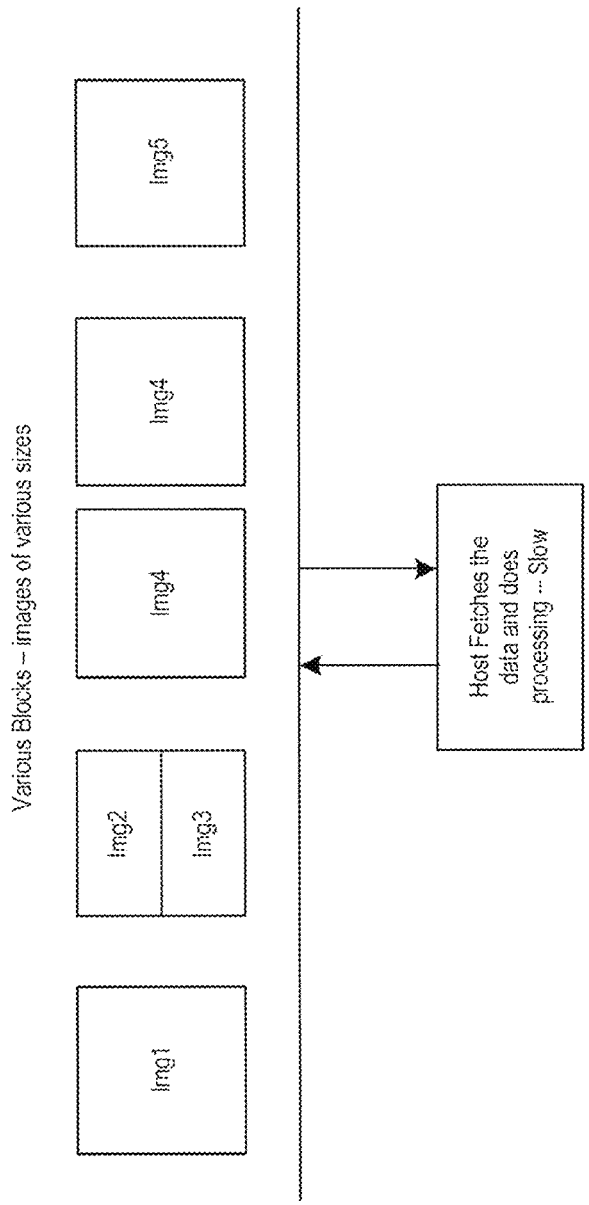
FIG. 4 is a block diagram that illustrates a slow image fetching and processing process.

As mentioned above, arriving images can lie anywhere in memory and not in memory locations that are optimized for future host usage. So, the host typically loads all the images one-by-one and performs required operations on the relevant images as foreground operations, which can be very slow. This is illustrated in the block diagram in FIG. 4.

The following embodiments can be used to address this problem. In general, in these embodiments, when the storage system 100 receives a request from the host 300 to store an image, the controller 102 of the storage system 100 creates a lower-resolution version of the image and stores both the original image and the lower-resolution version of the image in the memory 104. (Creation of low-resolution images can also be done in the background whenever the storage system 100 is idle and can be based on the budget available.) The resolution level of the lower-resolution version of the image can be based on the number of spare blocks in the memory 104 using predefined filters so that the details of the original image are not lost. As used herein, a spare block (or other memory unit) can be designated for used if a primary block (memory unit) becomes unavailable, can be designated to store a low-resolution copy, or just use be a block (memory unit) that is available for use. In addition to the number of spare block that are available, the controller 102 can also dynamically decide the resolution level based on the original image size. Some or all of the metadata of the original image can be mapped to the lower-resolution version of the image in such a manner that it takes minimal space. By maintaining the low resolution copy with similar details as the original image, many image-related applications can be accelerated. In contrast to storage systems that merely perform some basic image computes to free up the host, the storage system 100 of these embodiments can perform image filtering in the background, store the lower-resolution copies in spare blocks, and provide the copies (instead of the original) based on host application need for accelerated operation.

The following paragraphs provide an example of one implementation of an embodiment. It should be understood that this is merely an example, and other implementations can be used. The storage system 100 in this example is configured to provide the following features: (1) once the storage system 100 identifies an image, it generates a low-resolution copy of the image in the background; (2) the resolution level of the low-resolution copy is decided based on the original image size and/or available spare block capacity. As the low-resolution copy is optional, the storage system 100 can discarded it and regenerate it, if needed; (3) the resolution level of the low-resolution copy can be dynamically downgraded based on total spare space availability; (4) efficient mapping of the original image and low-resolution copy; and (5) the decision on which image to send to the host 300 (the original image or low-resolution copy) can be based on host application usage.

Figure 5:
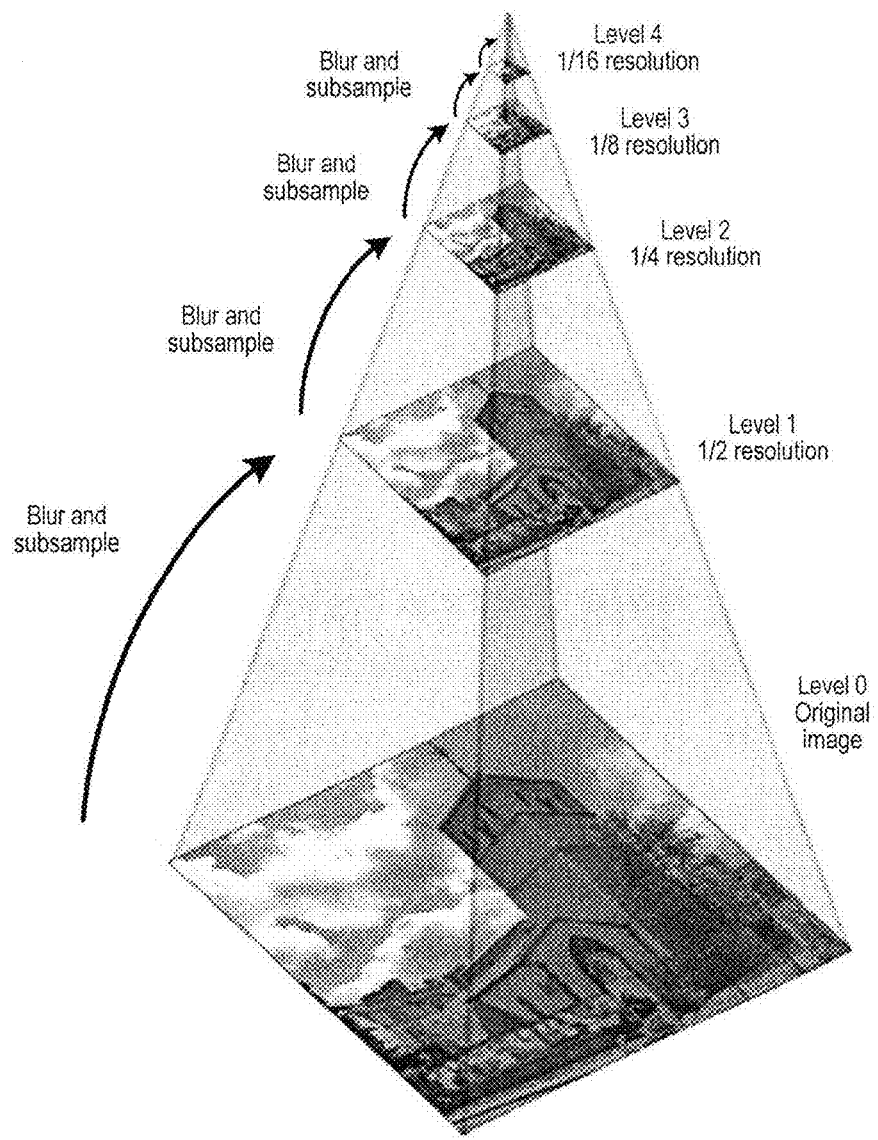
FIG. 5 is an illustration of an image pyramid of an embodiment.

In this example, the controller 102 generates the lower-resolution version of the image by sub-sampling with Gaussian pre-filtering. FIG. 5 is an illustration of an image pyramid that illustrates how the lower-resolution version of the image can be generated. The image pyramid can be generated on a dedicated central processing unit (CPU) in the background, by dedicated hardware meeting the processing power requirements, or by a dedicated digital signal processor (DSP) for acceleration.

Figure 6:
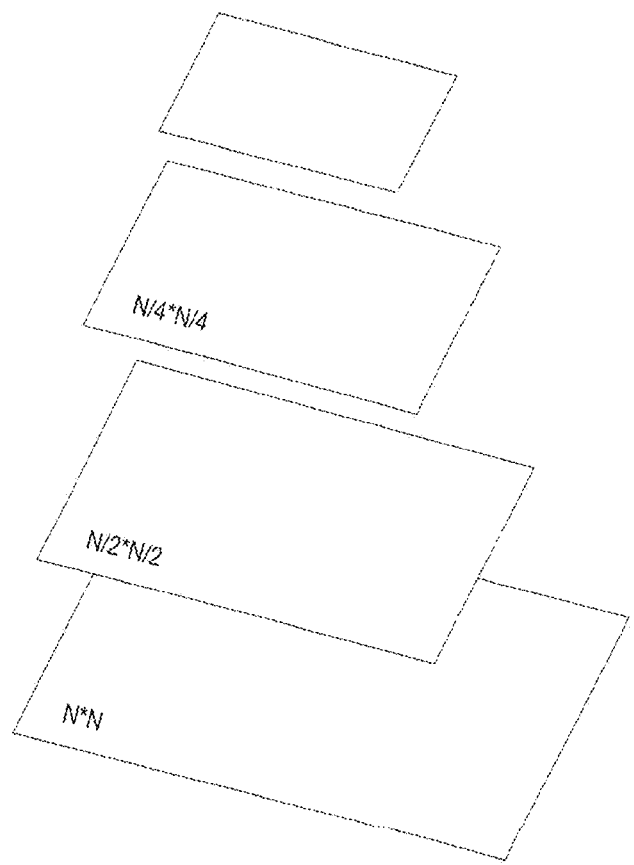
FIG. 6 is an illustration of an equation that can be used by a storage system of an embodiment to generate a lower-resolution version of an image.

FIG. 6 is an illustration of an equation that can be used by the controller 102 of the storage system 100 to generate a lower-resolution version of an image. The equation tells how much space is required to store each level and all the levels. If all the levels are stored, one-third extra space is required. However, all the levels may not be required. So, in this example, the controller 102 of the storage system 100 intelligently decides which level to generate and when to reduce the level as described below.

Figure 7:
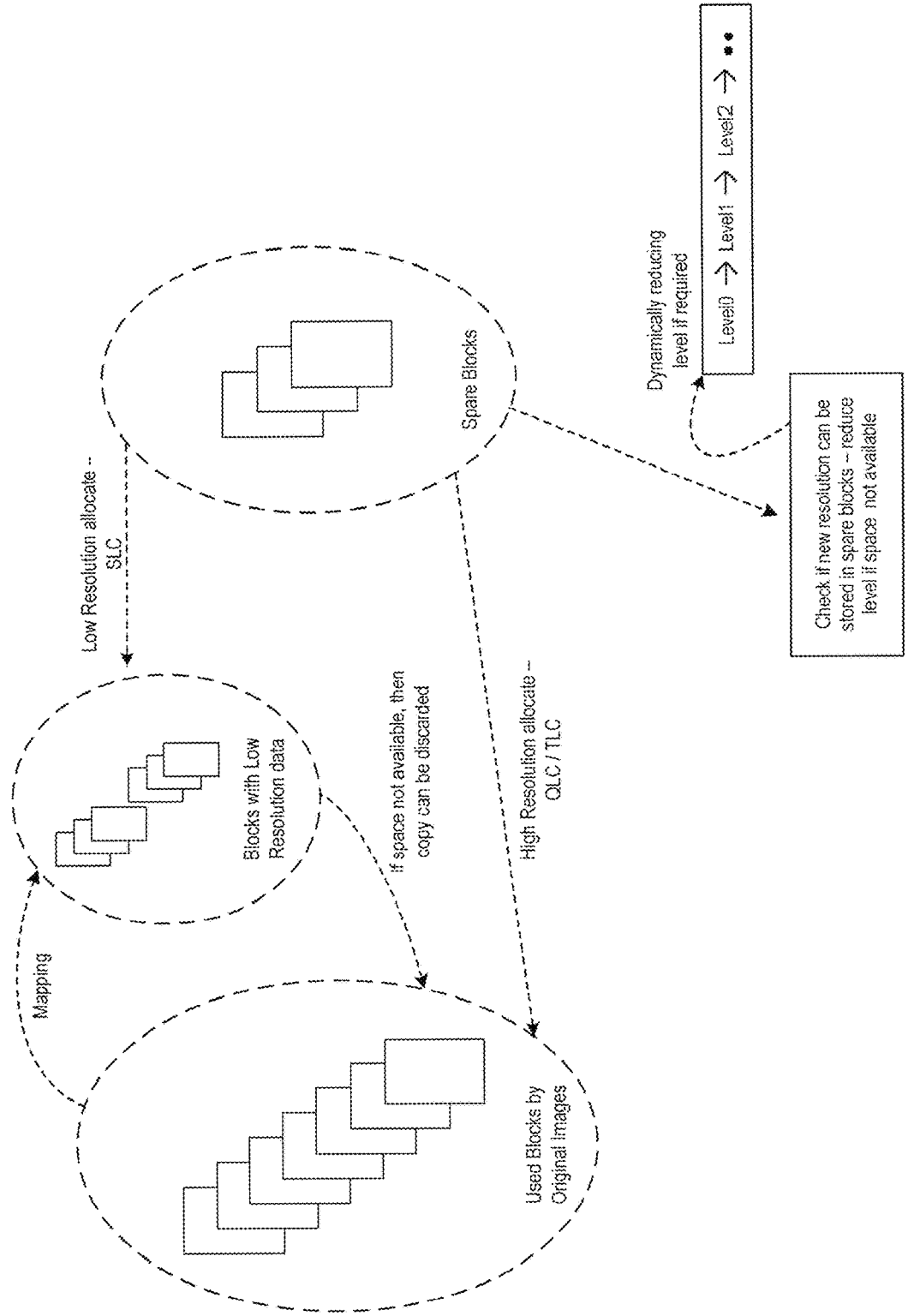
FIG. 7 is a block diagram illustrating a block-tracking method of an embodiment.

As discussed above, in this example, the controller 102 of the storage system 100 keeps track of the blocks with low-resolution images, the blocks with original images, and available spare blocks. Based on the space available, it generates new low-resolution images and keeps changing the levels of the existing images. FIG. 7 is a block diagram that illustrates a block-tracking method of an embodiment. As shown in FIG. 7, in this example, original images are stored in multi-level cell (MLC) blocks, such as quad-level cell (QLC) and triple-level cell (TLC) blocks, and low-resolution images are stored in single-level cell (SLC) blocks. The controller 102 maintains a map that associates each original image with its copy and can delete a copy if not enough space is available. As the number of spare blocks decreases, the controller 102 can dynamically reduce the resolution level of the copies (e.g., from Level 0 to Level 1 to Level 2, etc.). This is shown in more detail in FIG. 8.

Figure 8:
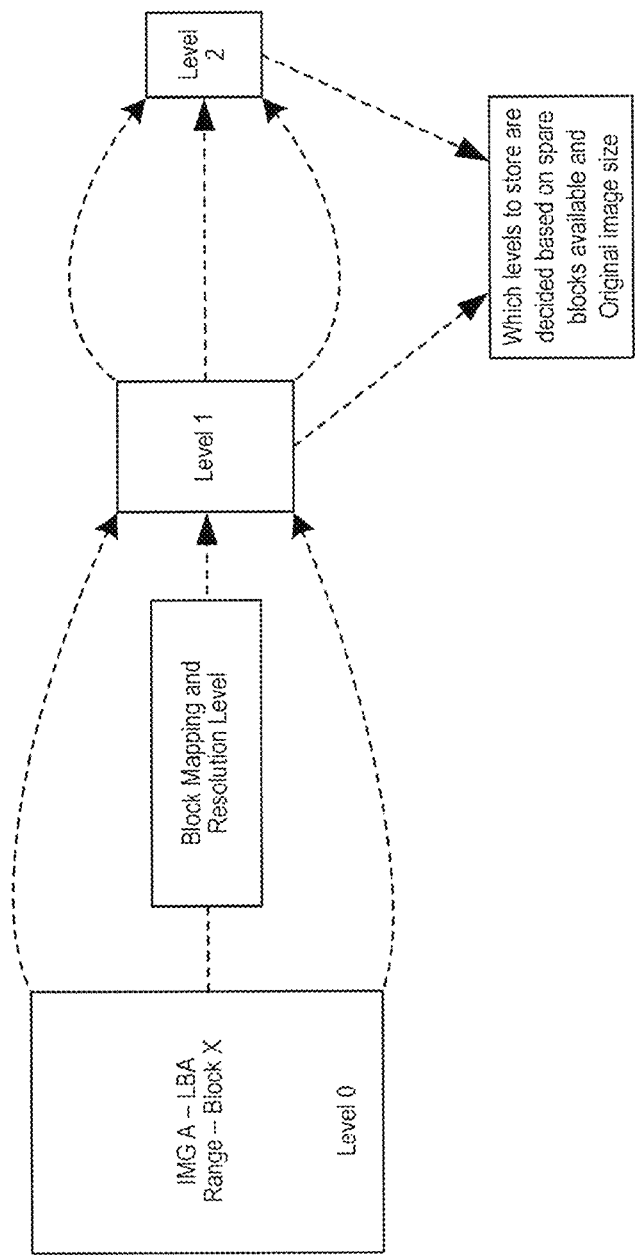
FIG. 8 is a block diagram illustrating a dynamic-resolution method of an embodiment.
Figure 9:
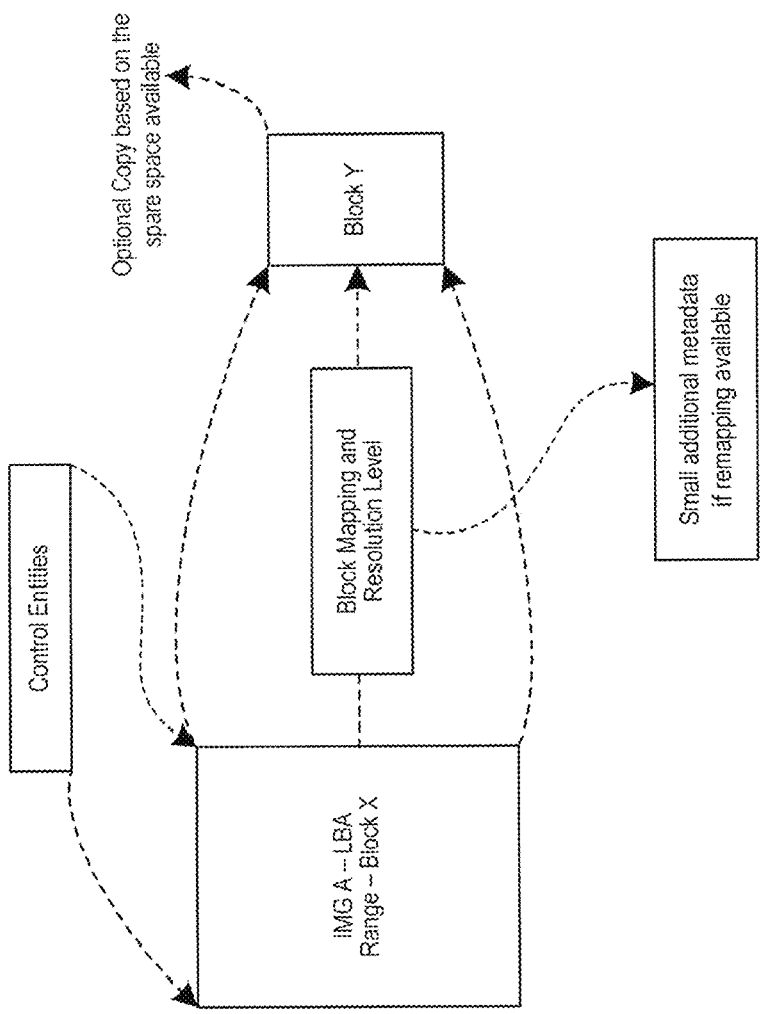
FIG. 9 is a block diagram illustrating a mapping method of an embodiment.

As shown in FIG. 8, an image at Level 0 is the full-version of the image, stored in its full logical block address (LBA) range. Through block mapping and resolution level determination, the controller 102 can create a lower-resolution version of the image as a Level 1 copy or an even lower-resolution version as a Level 2 copy. The controller 102 can decide which levels to store based on the number of spare blocks available and the original image size. The level can be decided in such a manner that enough details are available based on the original content. Further, the mapping can be done with minimal metadata. The map can maintain the location of each original image and its low-resolution copy, as well as the resolution level. Based on the level, the data and generated space can easily be calculated. An example of this mapping scheme is illustrated in FIG. 9.

Figure 10:
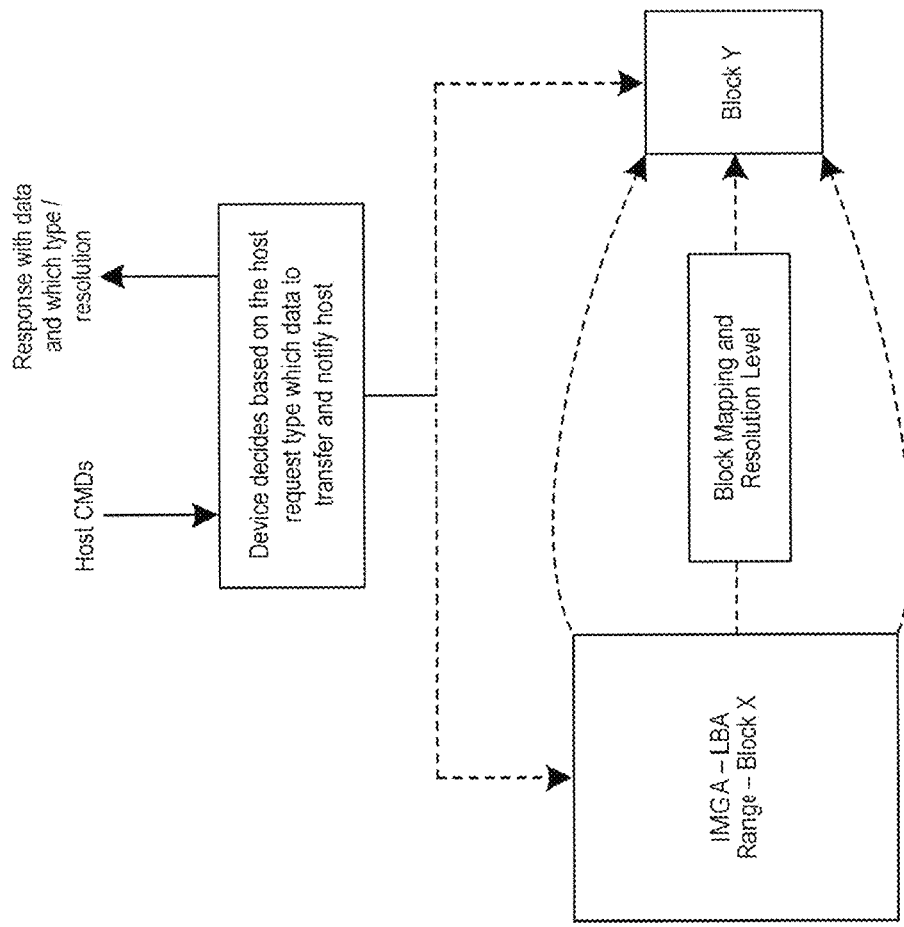
FIG. 10 is a block diagram illustrating a method performed by a storage system of an embodiment in deciding what image version to send to a host.

As mentioned above, when the storage system 100 gets a request for the image from the host 300, the controller 102 in the storage system 100 can decide whether to send the original image or the low-resolution copy. FIG. 10 is a block diagram illustrating a method for deciding what image version to send to the host 300. As shown in FIG. 10, the controller 102 can decide based on the host request type, which data to transfer, and then notify the host 300 as to that decision (and then transfer the data).

If the low-resolution copy is to be sent, the controller 102 can use the mapping structure to find the copy. So, based on the host application's usage of the image, the controller 102 can decide which version to send to meet the application's needs while optimizing bandwidth and performance. The following are examples of types of application usage that the controller 102 can consider. Of course, these are merely examples, and other usages can be used.

As one example, these embodiments can be used to provide a faster image search for similar content. For image searching purposes, low-resolution images contain enough information and can be used to identify similar content. Once a content match is obtained using the low-resolution image, the same can be used for higher-resolution levels. As another example, for a preview operation, the low-resolution image has all the details needed. When hundreds of images are displayed on a page, for a level 2 reduction, the time needed for the preview can be reduced by a factor of 16. For higher image sizes, it is even more beneficial (e.g., a level 3 reduction can be used to reduce the time further). As yet another example, for a compute operation, a low-resolution image can provide coarse-to-fine strategies for computational efficiency. The computes can first be done on the coarse level using the low-resolution copy and, if needed, the higher levels can be used for fine computing. Other example applications include image processing (e.g., edge tracking, texture representation, and image blending) and compression (e.g., the controller 102 can maintain the Laplacian pyramids derived from Gaussian pyramids to achieve compression of images).

In yet another embodiment for a compute-class card, the storage system 100 can accelerate some of the applications as well by implement the functionality of the applications. By having the in-built functionality, the transfer to the host 300 can be avoided and accelerated in the storage system.

In conclusion, by using low-resolution image levels and having the storage system 100 manage those levels efficiently, host applications can be accelerated, and processing time can be reduced.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A storage system comprising:
 a memory; and
 a controller configured to:
  receive an image;
  determine an amount of spare memory space;
  generate a lower-resolution version of the image, wherein a resolution level of the lower-resolution version of the image is based on the determined amount of spare memory space; and
  store the image and the lower-resolution version of the image in the memory, wherein the image is stored in multi-level memory cells in the memory and the lower-resolution version of the image is stored in single-level memory cells in the memory.

2. The storage system of claim 1, wherein the resolution level of the lower-resolution version of the image is also based on a size of the image.

3. The storage system of claim 1, wherein the controller is further configured to generate the lower-resolution version of the image as a background operation.

4. The storage system of claim 1, wherein the controller is further configured to:
 receive a request from a host for the image; and
 decide whether to send the image or the lower-resolution version of the image in response to the request.

5. The storage system of claim 4, wherein the controller is further configured to decide whether to send the image or the lower-resolution version of the image based on application usage.

6. The storage system of claim 5, wherein the application usage comprises one or more of the following: an image search, a preview command, a compute command, an image analysis application, and a compression application.

7. The storage system of claim 1, wherein the controller is further configured to generate the lower-resolution version of the image by sub-sampling with Gaussian pre-filtering.

8. The storage system of claim 1, wherein the controller is further configured to:
 track changes in the amount of spare memory space; and
 dynamically change the resolution level of the lower-resolution version of the image based on the tracked changes.

9. The storage system of claim 1, wherein the controller is further configured to maintain a map of memory locations of the image and the lower-resolution version of the image.

10. The storage system of claim 1, wherein the controller is further configured to associate at least some metadata of the image with the lower-resolution version of the image.

11. The storage system of claim 1, wherein the controller is further configured to delete the lower-resolution version of the image in response to a need for additional space in the memory.

12. The storage system of claim 1, wherein the memory comprises a three-dimensional memory.

13. A method comprising:
 performing the following in a storage system comprising a memory comprising primary blocks and spare blocks, wherein a spare block is configured to be used responsive to a primary block being unavailable:
  receiving an image;
  storing the image in available primary blocks in the memory; and
  generating and storing a lower-resolution copy of the image in available spare blocks in the memory, wherein a difference in resolution levels between the image and the lower-resolution copy of the image is based on a number of available spare blocks in the memory.

14. The method of claim 13, further comprising, in response to receiving a request for the image, deciding whether to send the image or the lower-resolution copy of the image.

15. The method of claim 13, further comprising dynamically changing the resolution level of the lower-resolution copy of the image based on changes to the number of available spare blocks in the memory.

16. A storage system comprising:
 a memory; and
 means for storing an image and a lower-resolution version of the image in the memory, wherein a difference between a resolution level of the image and a resolution level of the lower-resolution version of the image depends on an amount of spare memory,
 wherein the image is stored in multi-level memory cells in the memory and the lower-resolution version of the image is stored in single-level memory cells in the memory.

* * * * *